United States Patent
Haase et al.

(10) Patent No.: US 7,529,887 B1
(45) Date of Patent: May 5, 2009

(54) METHODS, SYSTEMS, AND COMPUTER PROGRAM PRODUCTS FOR POSTPONING BITMAP TRANSFERS AND ELIMINATING CONFIGURATION INFORMATION TRANSFERS DURING TRESPASS OPERATIONS IN A DISK ARRAY ENVIRONMENT

(75) Inventors: David Haase, Fuquay Varina, NC (US); Somnath A. Gulve, Morrisville, NC (US); Saurabh M. Pathak, Chapel Hill, NC (US); Michael D. Haynes, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 272 days.

(21) Appl. No.: 11/393,638

(22) Filed: Mar. 30, 2006

(51) Int. Cl.
*G06F 12/00* (2006.01)
(52) U.S. Cl. .................... 711/114; 711/154; 711/162
(58) Field of Classification Search .................. 711/112, 711/114, 161–162
See application file for complete search history.

(56) References Cited

U.S. PATENT DOCUMENTS

| | | | |
|---|---|---|---|
| 5,790,775 A * | 8/1998 | Marks et al. .................... 714/9 |
| 7,318,138 B1 * | 1/2008 | Usgaonkar .................. 711/163 |
| 2005/0052921 A1 * | 3/2005 | Butterworth et al. ........ 365/222 |
| 2005/0114728 A1 * | 5/2005 | Aizawa et al. ................. 714/6 |
| 2006/0031594 A1 * | 2/2006 | Kodama ........................ 710/5 |

* cited by examiner

*Primary Examiner*—Pierre-Michel Bataille
*Assistant Examiner*—Michael C Krofcheck
(74) *Attorney, Agent, or Firm*—Jenkins, Wilson, Taylor & Hunt, P.A.

(57) ABSTRACT

Methods, systems, and computer program products for postponing bitmap transfers and eliminating configuration information transfers during trespass operations in a disk array environment are disclosed. According to one method, a clone group is stored on a disk array, the clone group including a logical unit (LUN) representing a storage partition on the disk array and a clone of the LUN, the clone being a copy of the data referenced by the LUN. The clone group is associated with a first storage processor (SP) for writing data to the disk array. Changes between the LUN and the clone are tracked by maintaining a data structure indicative of the changes in a memory associated with the first SP. The association of the clone group is changed to a second SP for writing data to the disk array without transferring the data structure to memory associated with the second SP.

48 Claims, 12 Drawing Sheets

METHODS, SYSTEMS, AND COMPUTER PROGRAM PRODUCTS FOR POSTPONING BITMAP TRANSFERS AND ELIMINATING CONFIGURATION INFORMATION TRANSFERS DURING TRESPASS OPERATIONS IN A DISK ARRAY ENVIRONMENT

TECHNICAL FIELD

The subject matter described herein relates to trespassing of logical units (LUs) within a disk array environment. More particularly, the subject matter described herein relates to methods, systems, and computer program products for postponing bitmap transfers and eliminating configuration information transfers during trespass operations in a disk array environment.

BACKGROUND

Disk arrays may include groups of physical disks that are logically bound together to represent contiguous data storage space for applications. For example, disk arrays may be divided into redundant array of inexpensive disks (RAID) groups, which are disk arrays created by logically binding individual physical disks together to form the RAID groups. RAID groups represent a logically contiguous address space distributed across a set of physical disks. Each physical disk is subdivided into pieces used to spread the address space of the RAID group across the group (along with parity information if applicable to the RAID level). The physically contiguous pieces of the physical disks that are joined together to create the logically contiguous address space of the RAID group are called stripes. Stripes may form blocks and blocks may be allocated to create logical representations of storage space for use by applications within a system.

Applications access and store data incrementally by use of logical storage array partitions, known as logical units (LUNs). LUNs are made up of collections of storage blocks of a RAID array and are exported from the RAID array for use at the application level. LUNs are managed for use at the application level by paired storage processors (SPs). Ownership of a LUN is determined when the LUN is mounted by the application, with one of the paired SPs designated as the owner SP and the other SP acting as a backup processing device for the first.

LUNs may be duplicated by copying the contents of a source LUN to another LUN including new storage blocks, thereby creating a new LUN that is a duplicate of the source LUN (e.g., a clone). Clones may be used for archival purposes, such as point-in-time backups, and for restore points in the event of system failures or in order to retrieve older data. Data referenced by a source LUN or by a clone (when the clone is not used as a restore point) may change over time. These changes may be tracked by the use of bitmaps, known as delta maps or fracture logs, and configuration information. Delta maps are bitmaps that may track changed blocks by use of a bit associated with each physical storage data area referenced by a LUN. Configuration information may track processing objectives between a source LUN and a clone. For example, within a clone group, which includes a source LUN and related clones, configuration information may be used to identify synchronization processing activities between a clone or set of clones and a source LUN within the clone group.

Ownership of a LUN may change under a variety of circumstances. For example, ownership of a LUN may migrate from one SP to another for host load balancing reasons, for host failover events, for SP failures, and for manual trespass operations initiated by a user at an application level. Further, entire clone groups traditionally trespass together from one SP to another. The term "trespass," as used herein, refers to a change of association of a clone group from one SP to another SP.

In conventional systems, when ownership of a LUN migrates from one SP to the paired SP, data structures (e.g., delta maps) and configuration information for each LUN that is migrated are required to be communicated between the SPs. However, these data structures are not required for the change in ownership/association to occur. This information communication has traditionally been required to be completed prior to accessing a migrated LUN for input and output (I/O) operations. Accordingly, a migrating LUN is not useable for I/O purposes. Under some of the above-described circumstances where ownership may change, such as during a host failover event or an SP failure, many LUNs may need to be migrated from an owner SP to the paired SP. Under these circumstances, the time required for communicating delta map and configuration information for a migrating LUN may be lengthy due to I/O bandwidth limitations, resulting in degraded I/O performance.

Synchronization between a source LUN and a clone may occur either periodically or upon request from the application level or a system administrator. On conventional systems, synchronization requires a separate communication of data structures and configuration information between the original owner SP and the paired SP. Accordingly, conventional systems, in addition to imposing an unavailability associated with a trespass operation, also duplicate communication of delta maps and configuration information between original owner SPs and the paired SPs when a synchronization event follows a trespass operation. As well, certain configuration information that was transmitted during a trespass operation is only needed during a synchronization event. Accordingly, much of the communication bandwidth associated with a trespass operation is unnecessary in conventional systems.

Accordingly, in light of these difficulties associated with conventional trespass of LUNs, there exists a need for improved methods, systems, and computer program products for postponing bitmap transfers and eliminating configuration information transfers during trespass operations in a disk array environment.

SUMMARY

According to one aspect, the subject matter described herein comprises methods, systems, and computer program products for postponing bitmap transfers and eliminating configuration information transfers during trespass operations in a disk array environment. One method includes storing, on a disk array, a clone group including a logical unit (LUN) representing a storage partition on the disk array and a clone of the LUN, the clone being a copy of the data referenced by the LUN at a point in time, associating the clone group with a first storage processor (SP) for writing data to the disk array, tracking changes between the LUN and the clone by maintaining a data structure indicative of the changes in a memory associated with the first SP, and changing the association of the clone group to a second SP for writing data to the disk array without transferring the data structure to memory associated with the second SP.

The subject matter described herein for postponing bitmap transfers and eliminating configuration information transfers during trespass operations in a disk array environment may be implemented using a computer program product comprising computer executable instructions embodied in a computer-readable medium. Exemplary computer-readable media suitable for implementing the subject matter described herein include chip memory devices, disk memory devices, programmable logic devices, and application specific integrated circuits. In addition, a computer-readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
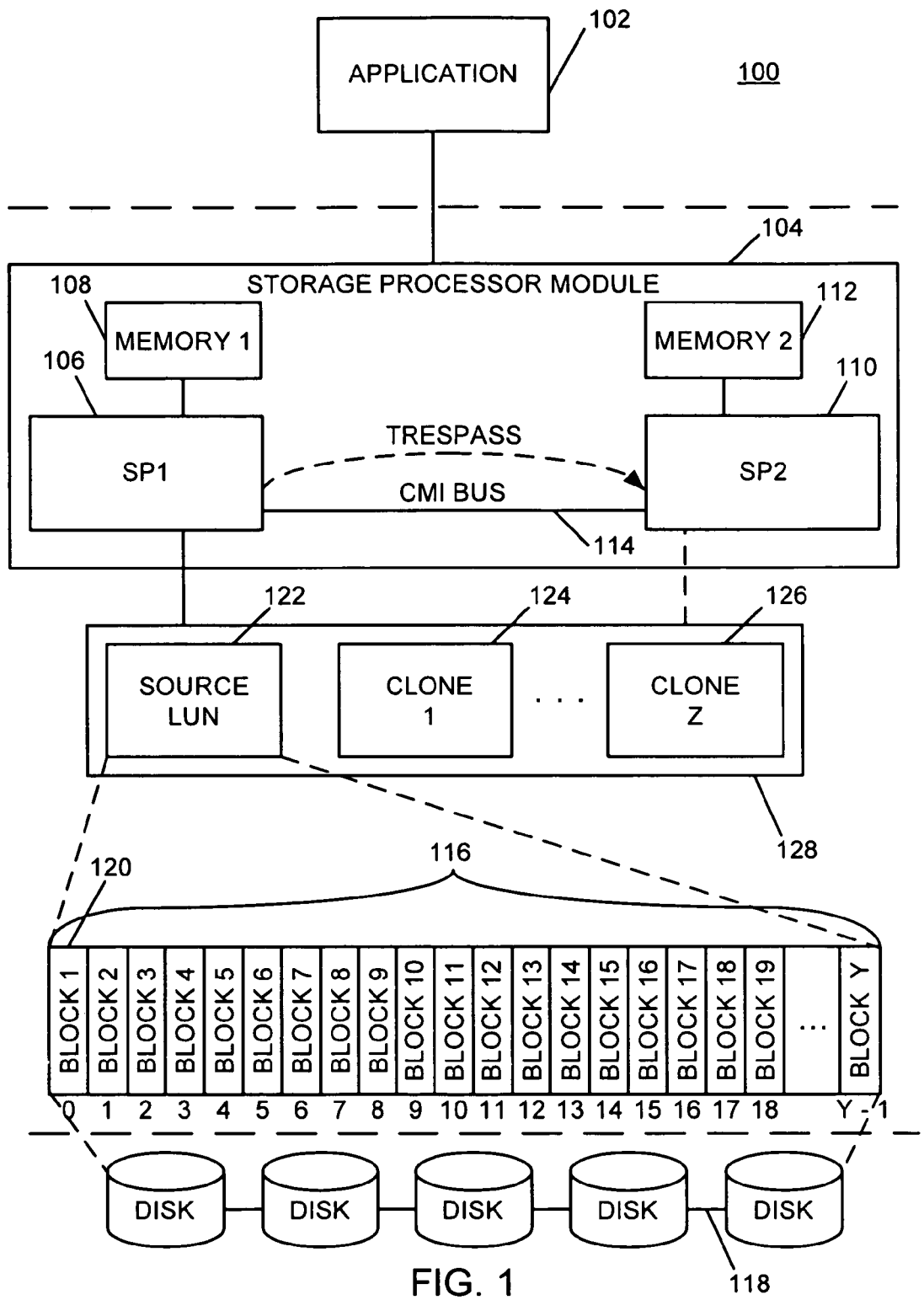
FIG. 1 is a block diagram of an exemplary disk array application environment for providing storage processing functions for an application according to an embodiment of the subject matter described herein.

In view of the problems described above with respect to conventional trespass of LUNs, the subject matter described herein provides for postponing bitmap transfers and eliminating configuration information transfers associated with trespass operations. Where previously a trespass of a LUN or clone group initiated a communication of delta maps and configuration information between an owner SP and a paired peer SP which manage LUNs within a RAID array, resulting in lengthy delays for I/O operations, the methods, systems, and computer program products described herein postpone bitmap transfers and eliminate configuration information transfers associated with trespass operations to improve trespass times in a RAID environment. By adapting trespass operations to postpone bitmap transfers and to eliminate configuration information transfers associated with the trespass operations, trespass times may be reduced and I/O operations may be improved. Certain information previously communicated as part of the configuration information may be more rapidly calculated from information stored redundantly in memory associated with each SP and persistently to disk rather than communicated, as will be described in more detail below.

Information that is stored redundantly in memories associated with each SP includes state information for all clones within each clone group and reverse synchronization image (revSyncImage) information for each source LUN. This information is generated and stored in a local memory associated with an SP when any clone is created and when any subsequent changes are made to a clone or to a source LUN. Upon generation of this information, the generating SP will communicate this information to the peer SP and store the information to disk. In this way, the redundant SPs will be aware of all clone groups within the system. Further, by storing this information persistently to disk, either SP may access the information upon reboot after any event that has removed the information from the memories that are associated with the peer SPs.

Information that was previously communicated as part of the configuration information during a trespass operation includes an image phase (imagePhase) indicator. The image phase indicator is used to synchronize a clone with a source LUN or to reverse synchronize a source LUN to a clone, as will be described in more detail below. Because the image phase indicator may now be calculated from the state of a clone and reverse synchronization image information, communication of this information during trespass operations is no longer needed. This information may be calculated faster than communicated between the SPs because initiation and completion of communications between the SPs takes more time than calculation of the image phase indicator locally. Accordingly, trespass times may be improved relative to conventional systems by calculating image phase indicators rather than communicating them between SPs.

The following state table will be used to define clone states and actions related to calculating an image phase.

TABLE 1

Calculation of Image Phase for a Clone

| Image Phase of a Clone | State of Clone |
|---|---|
| Replay Fracture Log | 1) Out of Sync |
| | 2) Synchronizing |
| | 3) In Sync |
| | 4) Consistent "and" (Reverse Sync Image Index of source LUN != index of clone) |
| Replay Reverse Fracture Log | 1) Reverse Out of Sync |
| | 2) Reverse Syncing |
| | 3) Consistent "and" (Reverse Sync Image Index of source LUN == index of clone) |

As can been seen from Table 1, an image phase for clone may have two values: "replay fracture log" and "replay reverse fracture log." The image phase may be set to replay fracture log when the state of the clone is any one of "out of sync," "synchronizing," "in sync," and "consistent" when a reverse sync imagine index of the source does not equal the index of the clone. The imagine phase of a clone may be set to replay reverse fracture log when the state of the clone is any of "reverse out of sync," "reverse syncing," and "consistent" when a reverse sync imagine index of the source equals the index of the clone.

As will be described in more detail below, the reverse sync image index value for a source LUN may be set to an index of a clone within a clone group to indicate that the clone referenced by the index is being used to reverse sync the source LUN. Accordingly, the image phase of a clone may be set to replay reverse fracture log when a reverse sync has been requested by an application and is either queued or in process. The image phase of a clone may be set to replay fracture log when an application has requested a sync operation to synchronize a clone with a source LUN and that request is either queued or in process.

FIG. 1 illustrates an exemplary disk array application environment 100 for providing storage processing functions for an application within a disk array. An application 102 may interface with a storage processor module 104. Application 102 may include in the application with storage requirements that may be implemented using a disk array. Storage processor module 104 may provide redundant storage processing capabilities for disk array application environment 100.

Within storage processor 104, a storage processor 1 (SP1) 106 may interface with a memory 1 108. SP1 106 may include one or two central processing units (CPUs) to provide increased performance capabilities within SP1 106. Memory 1 108 may be used for storage of data structures information used by SP1 106 to process storage requests from application 102.

An SP2 110 and a memory 2 112 represent redundant storage processing capabilities within storage processor module 104 and may be used for load balancing and failure mode activities within storage processor module 104.

A communications management interface (CMI) BUS 114 interconnects SP1 106 and SP2 110. CMI BUS 114 may be used for inter-processor communications related to redundant storage activities within disk array application environment 100 and for load balancing in failure mode operations.

A data storage pool 116 represents a logically contiguously view of a physical RAID array 118, and as such, provides a mapping of storage extents 120 on to RAID array 118. For simplification, data storage pool 116 is illustrated as a logical layer that resides adjacent to RAID array 118, which may include physical disks. However, it is understood that one or more logical layers, such as aggregations of pools 116 and RAID groups, that reside between data storage pool 116 and the physical disks that make up RAID array 118 without departing from the scope of the subject matter described herein. An exemplary hardware platform on which disk array application environment 100 may be implemented is the CLARiiON® platform available from EMC Corporation of Hopkinton, Mass.

A source LUN 122 may be used to map a virtual address space for application 102 onto data storage pool 116 and RAID array 118. Storage blocks 120 within data storage pool 116 may be allocated either contiguously or non-contiguously within disk array application environment 100, and the logical address space of source LUN 122 may, thereby, be mapped to physical storage space within data storage extent pool 116 and RAID array 118.

Application 102 may request point-in-time copies of source LUN 122 to be created for archival and restoration purposes. Accordingly, a clone 1 124 up to a clone Z 126 may be created over time by the allocation of new storage blocks within data storage pool 116 and RAID array 118 or within another data storage pool in RAID array by the allocation of new storage extents and the copying of data from storage extents associated with source LUN 122. Accordingly, when a clone is created, new storage extents may be allocated and data may be copied from physical storage extents associated with a source LUN to a newly allocated storage space associated with the clone. In this way, a clone may provide a persistent representation of data within the logical address space of application 102.

Source LUN 122 and any associated clones, such as clone 1 124 through clone Z 126 may be associated within a clone group 128. Accordingly, clone group 128 may increase and decrease in size over time as clones are created and destroyed.

Ownership of source LUN 122 and any clones clone group 128 may be assigned to either SP1 106 and SP2 110. FIG. 1 depicts a solid line between SP1 106 and clone group 128 to represent that SP1 will be assumed to be the current owner of clone group 128.

Under certain circumstances ownership of a source LUN and any associated clones within a clone group may be trespassed from SP1 106 to SP2 110. For example, host load balancing, host failover, SP failures, manual trespass operations initiated by a user of application 102, and trespass of clones in response to a trespass of a source LUN all represent exemplary situations in which a trespass of ownership from SP1 106 to SP2 110 may occur. A dashed line entitled "Trespass" and a dashed line between SP2 110 and clone group 128 indicate that the ownership may change from SP1 106 to SP2 110 based upon a trespass operation, as will be described in more detail below.

Figure 2A:
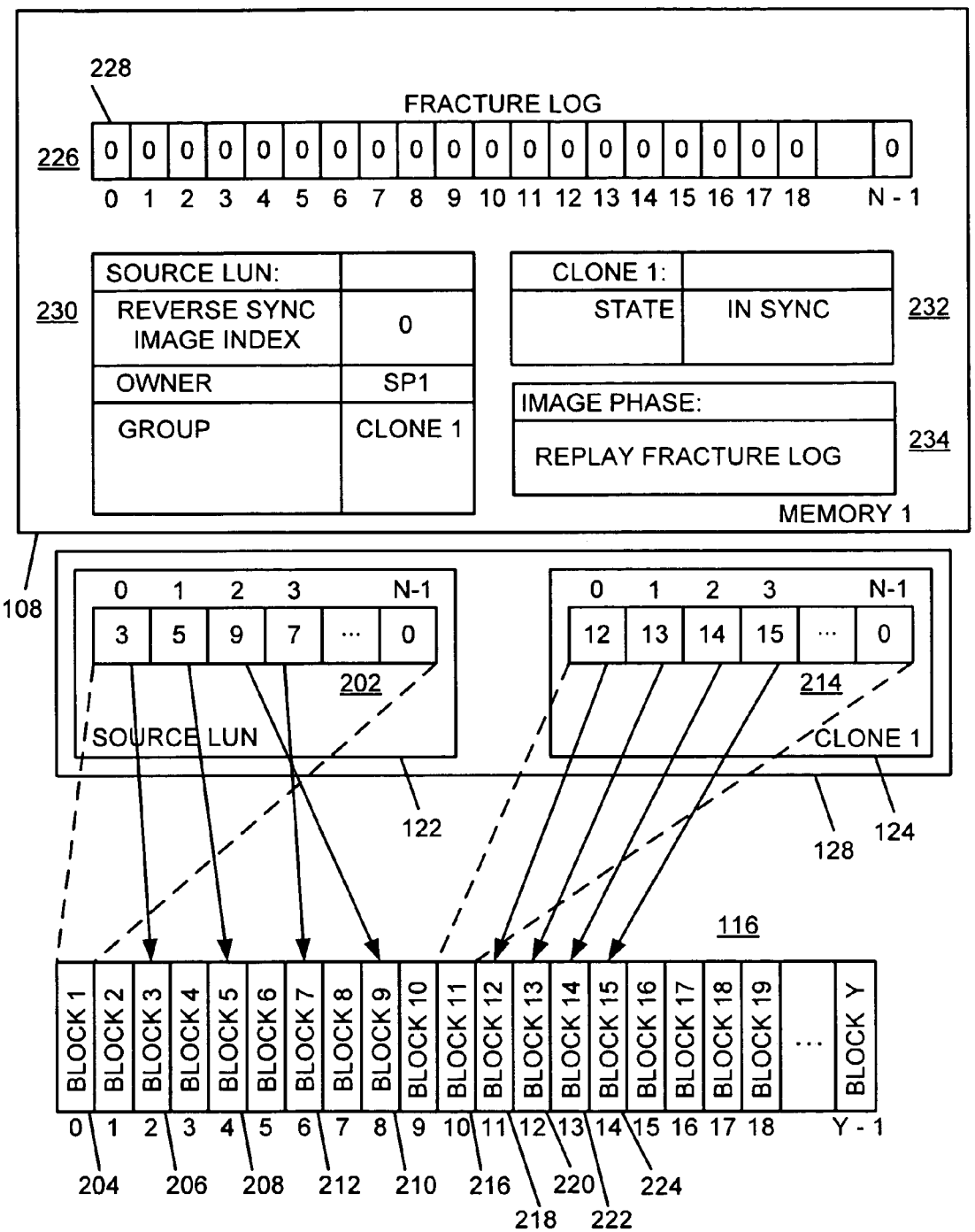
FIG. 2A is a block diagram of an exemplary disk array application environment including storage extent tracking data structures for managing trespass operations at a point in time when source logical unit (LUN) for tracking storage extent allocations has been used by application and a clone of the source LUN has been created according to an embodiment of the subject matter described herein.
Figure 2B:
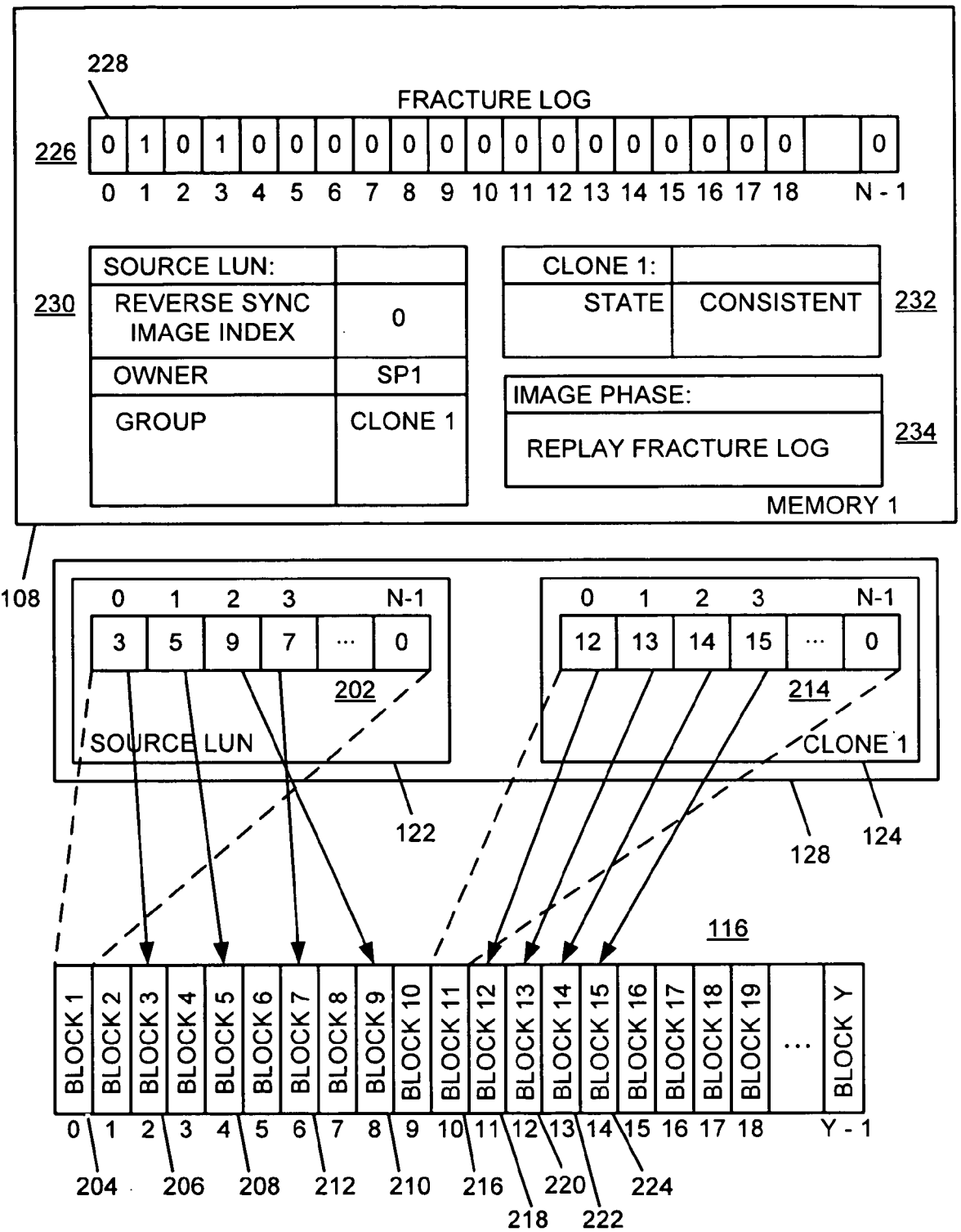
FIG. 2B is a block diagram of an exemplary disk array application environment including storage extent tracking data structures for managing trespass operations a point in time after an application has written data to two storage extents referenced by a source LUN according to an embodiment of the subject matter described herein.

FIGS. 2A-2B illustrate a magnified view of the exemplary RAID application environment including storage extent tracking data structures for managing trespass operations within disk array application environment 100. For purpose of illustration, clone group 128 is shown to include source LUN 122 and clone 1 124 within FIGS. 2A and 2B. Further, memory 1 108 associated with SP1 106 is also depicted within FIGS. 2A-2B. Other portions of storage processor module 104 are not depicted within FIGS. 2A-2B to simplify the description herein.

As described above, storage extent pool 116 may be dynamically allocated from available storage extents within storage extent pool 116 and RAID array 118 as application 102 generates data for regions of its virtual address space. FIG. 2A illustrates a point in time when source LUN 122 has been used by application 102 and clone 1 124 has just been created. A storage pointer structure 202 within source LUN 122 is indexed from 0 to N−1 to represent storage locations that make up the virtual address space of application 102. Storage pointer structure 202 may be stored either in memory 1 108 or within a storage block of storage extent pool 116. Dashed lines within FIG. 2A represent that storage pointer structure 202 is stored in block 1 204 of storage extent pool 116. Storage pointer structure 202 includes block numbers three (3), five (5), nine (9), and seven (7) at indices zero (0), one (1), two (2), and three (3) within storage pointer structure 202. Arrows within FIG. 2A illustrate that block 3 206, block 5 208, block 9 210 and block 7 212 have been allocated for these regions of the virtual address space represented within source LUN 122. It should be noted that the storage extents are non-contiguous within storage extent pool 116, but contiguous allocation are also possible.

Clone 1 124 is illustrated to include a storage pointer structure 214 stored in block 11 216 of storage extent pool 116. Because clone 1 124 represents a point-in-time back up of source LUN 122, data has been copied from storage extents associated with source LUN 122 and referenced within storage pointer structure 202 to newly allocated storage extents reference by storage pointer structure 214 within clone 1 124. Accordingly, block 12 218, block 13 220, block 14 222, and block 15 224 have been referenced within storage pointer structure 214 at indices zero (0), one (1), two (2), and three (3), respectively. With the storage extents allocated within storage pointer structure 214 of clone 1 124 and with data copied to them from the storage extent referenced by storage pointer structure 202 of source LUN 122, a redundant data set has been created for application 102 that may be used to reference changes in either source LUN 122 or clone 1 124 against the other.

In order to track changes in either source LUN 122 or clone 1 124 against the other, a fracture log 226 is illustrated including indicators 228 indexed from 0 to N−1, each representing an indication of changed data referenced by either storage pointer structure 202 within source LUN 122 and storage pointer structure 214 within clone 1 124, as will be described in more detail below.

A source LUN tracking structure 230 is illustrated within memory 1 108, including a reverse sync image index field set to a null value of zero (0), an owner field set to SP1 to indicate that SP1 106 is the owner of source LUN 122, and a group field including an indicator that clone 1 124 is a member of clone group 128 with source LUN 122. Source LUN tracking structure 230 may be used during trespass operations, as will be described in more detail below, to manage migration of clone groups and ownership change as well as to indicate when sync operations are to be preformed between a source LUN and a clone.

A clone tracking structure 232 is illustrated within memory 1 108 including a state field representing a current state of "in sync." Many states are possible for a clone, some of which have been illustrated and described above in relation to Table 1. Because clone 1 124 is assumed to have just been created within FIG. 2A, its state may be considered to be in sync with source LUN 122 because there are no differences between the data represented in the respective storage locations referenced by each LUN. As well, all indicators 228 within fracture log 226 are cleared to represent that there are no differences between the data referenced by source LUN 122 and clone 1 124.

An image phase 234 is illustrated within memory 1 108. An image phase, as described above, may be calculated upon a trespass of a clone group from one SP to another SP and may be used as an indication of a future sync operation or reverse sync operation that may be preformed. Image phase 234 includes an initial value of "replay fracture log" to coincide with the "in sync" state of clone 1 124 represented within clone tracking structure 232, as described in more detail above in relation to Table 1.

FIG. 2B illustrates a state change within disk array application environment 100 after application 102 has written data to two storage extents referenced by source LUN 122. For purposes of illustration, it will be assumed that application 102 wrote to block 5 208 and block 7 212 at indices one (1) and three (3) within storage pointer structure 202 and fracture log 226. Accordingly, two indicators within facture log 226 at indices one (1) and three (3) have been set within FIG. 2B.

Because data referenced by source LUN 122 has been changed by application 102, data referenced by clone 1 124 no longer mirrors the data represented by source LUN 122. The state field within clone 1 tracking structure 232 has been changed to a "consistent" state. A consistent state for a clone may exist when data represented by a clone accurately represents valid data for the point in time at which it was created, but that the data represented by a source LUN associated with the clone has since changed. Accordingly, should application 102 need to revert to the data set represented by clone 1 124, clone 1 124 may be used to reverse sync source LUN 122 because the state of clone 1 124 is consistent. Further, as described in more detail below, clones may be synced to source LUNS after clones have been created. In this way, a clone may be kept periodically synchronized with a source LUN to maintain a redundant data set without creating new clones to represent the point-in-time copy associated with the point in time when the sync operation occurred.

FIGS. 3A-3D illustrate disk array application environment 100 tracking structure communications and updates associated with trespass operations and sync operations. FIGS. 3A-3D add memory 2 112 in order to illustrate inter-processor communications and resulting operations on data structures between SP1 106 and SP2 110. FIGS. 3A-3D also have detailed depictions of storage extent mappings for source LUN 122 and clone 1 124 onto storage extent pool 116 removed.

Figure 3A:
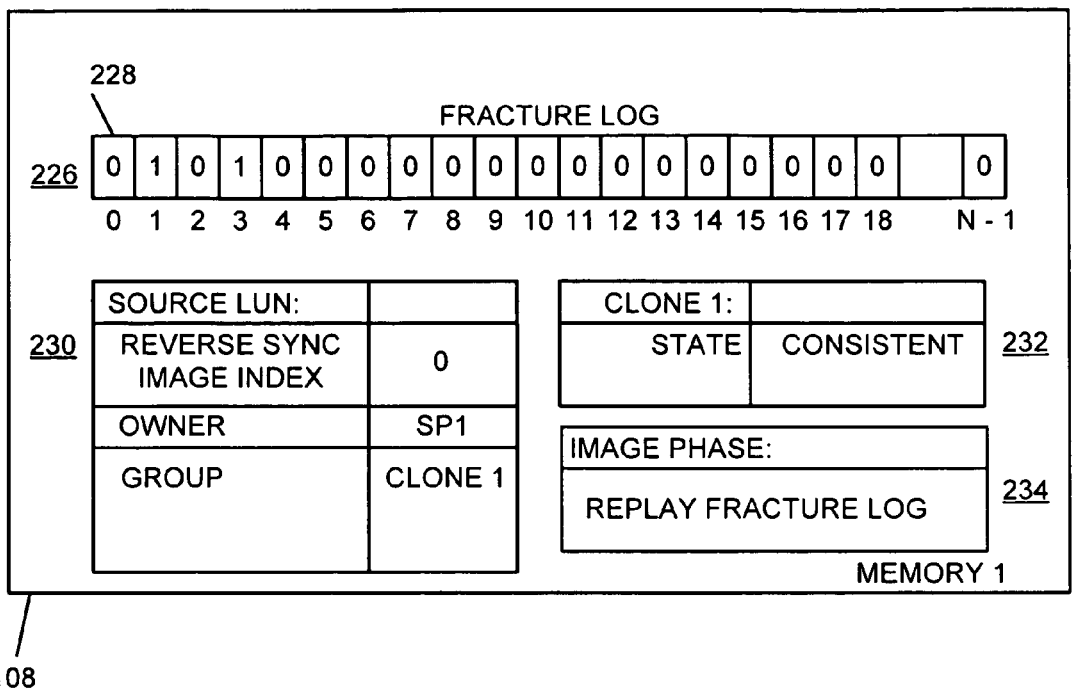
FIG. 3A is a block diagram of an exemplary disk array application environment including trespass and synchronization data structures for managing trespass operations at a point in time after a clone group has been updated to a peer storage processor (SP) prior to a synchronization operation according to an embodiment of the subject matter described herein.
Figure 3A:
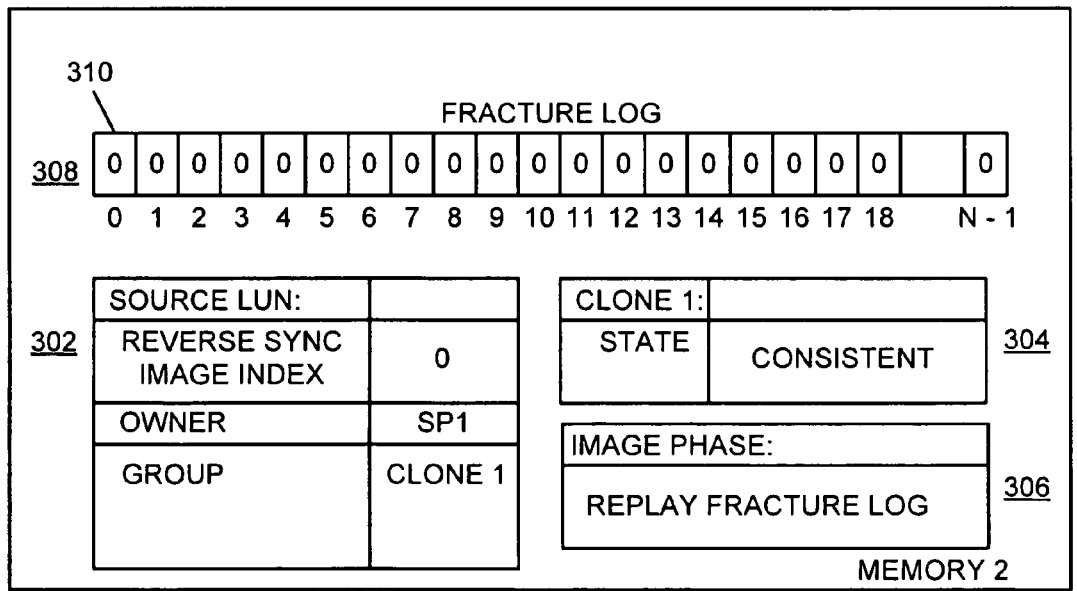

FIG. 3A depicts a state of disk array application environment 100 after clone group 128 has been updated in memory 2 112 of SP2 110. Within memory 2 112, data structures similar to those described above in relation to memory 1 108 are illustrated. Accordingly, a source LUN tracking structure 302, a clone tracking structure 304, an image phase 306, and a fracture log 308 are illustrated within memory 2 212. Each of source LUN tracking structure 302, clone tracking structure 304, image phase 306, and fracture log 308 may be used as described above and in more detail below for tracking information associated with clone groups that may be trespassed between SP1 106 and SP2 110. Fracture log 308 includes indicators 310 which may be used to mirror the contents of fracture log 226 within memory 1 108, as will be described in more detail below.

As described above in relation to FIG. 2B, source LUN 122 and clone 1 124 differed by the contents of two storage extents represented by indices one (1) and three (3) in fracture log 226. Accordingly, as can be seen from FIG. 3A, source LUN tracking structure 230 has been communicated over CMI Bus 214 from SP1 106 to SP2 110. Upon receipt, SP2 110 has updated source LUN tracking structure 302 equivalent to source LUN tracking structure 230 with comparable fields as described above. Clone tracking structure 304 has also been updated in memory 2 112 to be equivalent to clone tracking structure 232 in memory 1 108. Image phase 306 has also been updated to reflect the current setting of image phase 234 within memory 1 108. However, fracture log 308 has not been updated and includes default values. As described above and in more detail below, fracture log 308 may be updated after a trespass operation in response to a sync event.

By periodically communicating source LUN tracking structures and clone tracking structures associated with clone groups from an owner SP to an non-owner SP, trespass operations may occur and the non-owner SP may become the owner SP without excessive data structure communications by already having current information related to the clone group stored in local memory. Accordingly, during a trespass operation these tracking structures may be accessed directly from the non-owner SP that is to become the owner SP without a need to communicate the tracking structures over CMI Bus 114 at that point in time.

In conjunction with periodically updating a non-owner SP with clone group tracking structures, the clone group tracking structures may also be written to disk and stored, for example, within storage data pool 116. In this way, clone group tracking structures may persist between power cycles within disk array application environment 100.

Figure 3B:
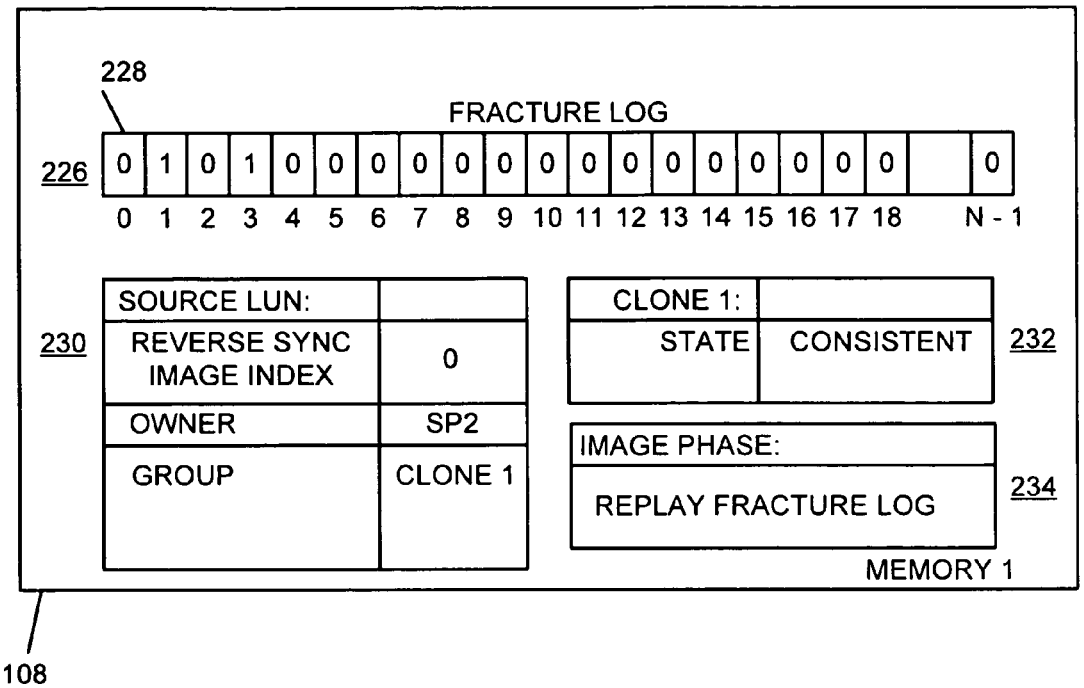
FIG. 3B is a block diagram of an exemplary disk array application environment including trespass and synchronization data structures for managing trespass operations at a point in time after a trespass of a clone group to a peer SP has occurred according to an embodiment of the subject matter described herein.
Figure 3B:
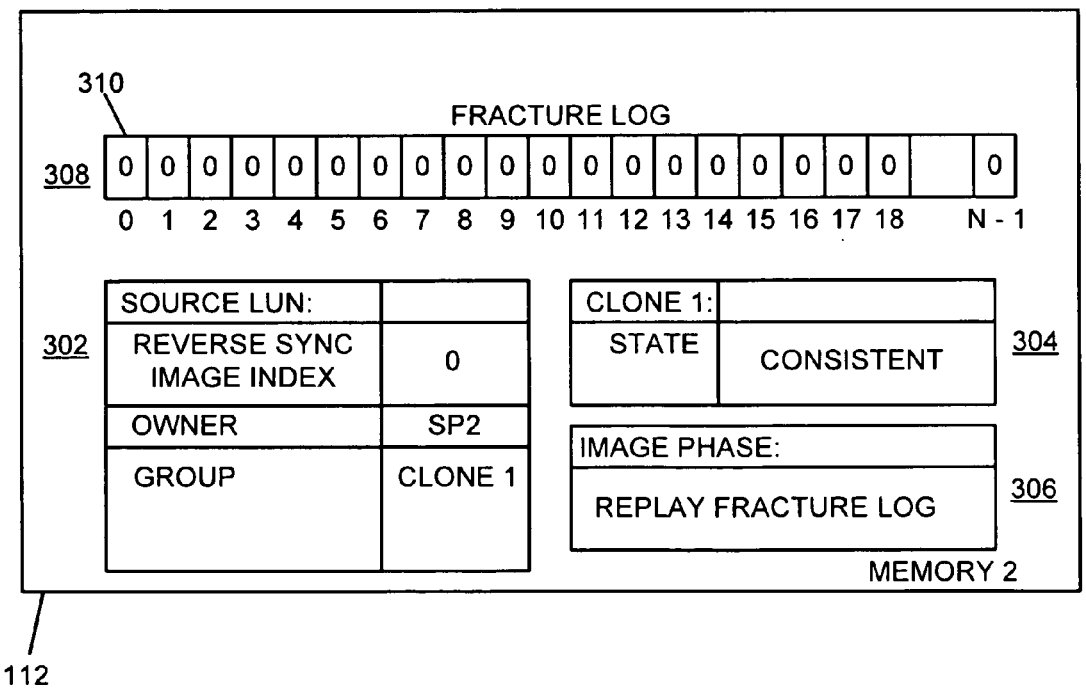

FIG. 3B illustrates disk array application environment 100 after a trespass operation has occurred and SP2 110 has become the owner of clone group 128. As can be seen from FIG. 3B, the owner field of both source LUN tracking structure 230 and source LUN tracking structure 302 have been changed to indicate that SP2 110 is now the owner of clone group 128. This change in ownership may be initiated by either SP. Accordingly, with the trespass initiated by SP1 106, SP1 106 may change the owner field within source LUN tracking structure 230 prior to initiating a trespass or in response to a successful completion of a trespass and may communicate information associated with the trespass occurring over CMI Bus 114 to SP2 110. In response SP2 110 may update the owner field within source LUN tracking structure 302. In the alternative, when a trespass operation occurs under control other than the control of SP1 106, for example during a temporary failure of SP1 106, SP2 110 may update the owner field within source LUN tracking structure 302 and may communicate the ownership change to SP1 106 when it recovers. In response, SP1 106 may update the owner field of source LUN tracking field 230 to indicate that SP2 is the current owner of clone group 128.

FIG. 3B also illustrates that an image phase 306 has also been calculated and stored within memory 2 112 by SP2 110. An image phase, as described above, may be calculated upon a trespass of a clone group from one SP to another SP and may be used as an indication of a future sync operation or reverse sync operation that may be preformed. In contrast to conventional systems, disk array application environment 100 may postpone bitmap transfers and may eliminate configuration data transfers during a trespass operation and may, thereby, make clone groups accessible to applications, such as application 102, without the delays associated with communicating bitmaps and configuration data in conventional systems.

As described above, during certain failover events, many clone groups may need to be trespassed from one SP to another SP. Accordingly, in conventional systems, where bitmaps and configuration data were transmitted for each trespass operation, significant bandwidth consumption was involved. In contrast, disk array application environment 100 may provide for a more rapid trespass of clone groups from one SP to another.

By postponing bitmap communication and by removing configuration data communication and by calculating image phase 306 on SP2 110 in response to a trespass operation, SP2 110 may perform a future sync operation at a scheduled interval or in response to a request from application 102 and may request fracture log 228 at that future point in time when bandwidth requirements have decreased.

Image phase 306 includes an indicator set to "replay fracture log." As described above in relation to Table 1, an image phase set to replay fracture log suggests that when a sync operation occurs, the synchronization may be a forward synchronization from source LUN 122 to clone 1 124. Alternatively, when image phase 306 is set to "replay reverse fracture log," it suggests that when a sync operation occurs, the synchronization may be a reverse synchronization from clone 1 124 to source LUN 122. By default, image phase 306 may be calculated, based upon the criteria specified in Table 1, and in this case, because the state of clone 1 124 is consistent within clone tracking structure 304 and because the reverse sync image index field of source LUN tracking structure 302 does not equal one (1), the index of clone 1 124, the image phase may be set to replay fracture log.

Figure 3C:
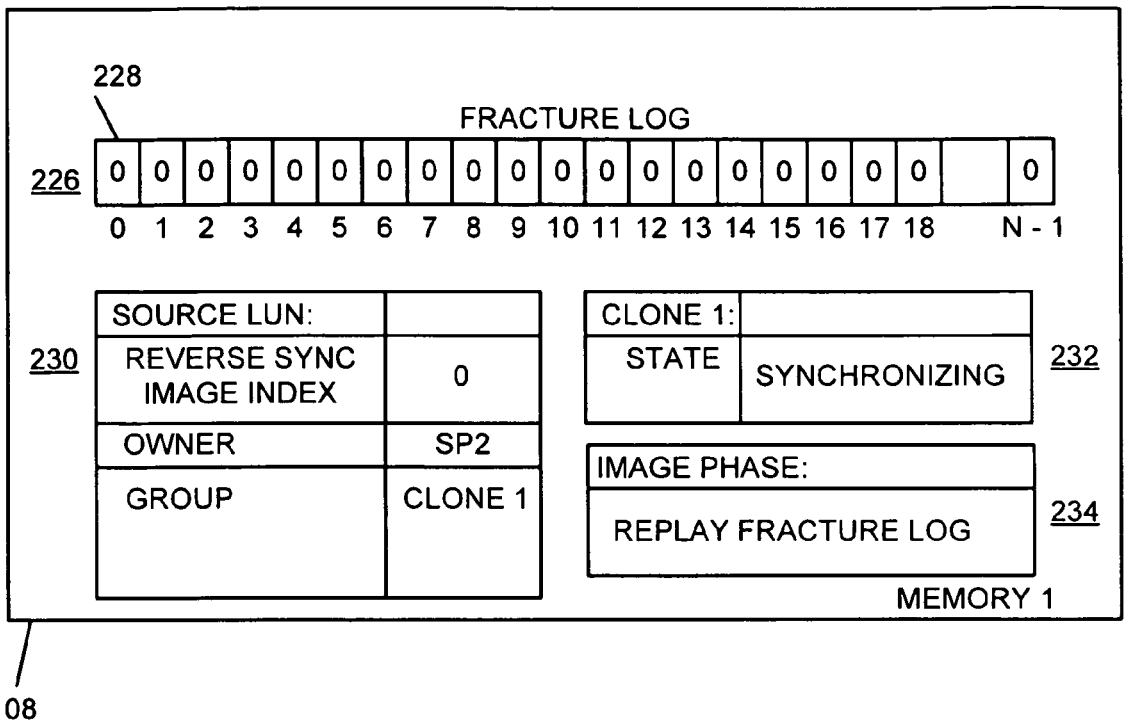
FIG. 3C is a block diagram of an exemplary disk array application environment including trespass and synchronization data structures for managing trespass operations at a point in time after an application has requested a forward synchronization of a clone to a source LUN according to an embodiment of the subject matter described herein.
Figure 3C:
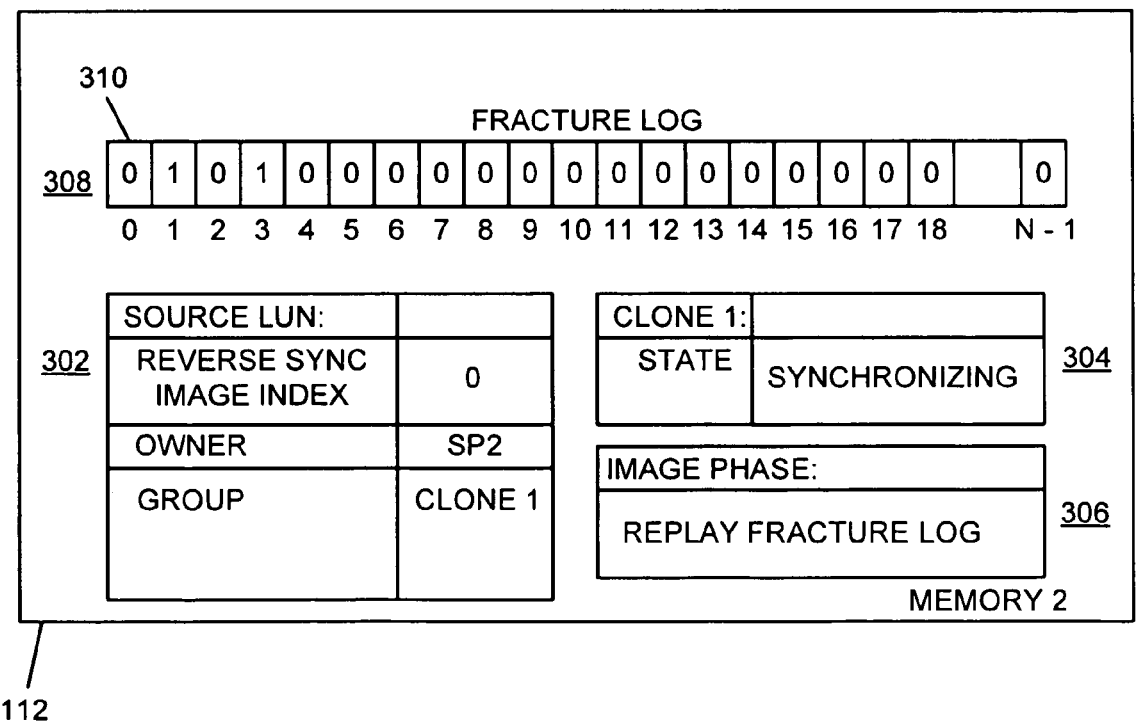

FIG. 3C illustrates disk array application environment 100 tracking structures after starting a sync of clone 1 124 relative to source LUN 122. Sync requests may be queued and scheduled. For purposes of illustration, it will be assumed that any delay associated with queuing the sync operation has passed and that the state of disk array application environment 100 depicted in FIG. 3C is at a point in time after the sync operation has begun.

As described above, fracture logs may be requested at the time of a sync request. Accordingly, SP2 110 may request fracture log 226. In response to receipt of the contents of fracture log 226, SP2 110 may update fracture log 308 in memory 2 112. It should be noted that fracture log 226 within FIG. 3C has all indicators cleared. When SP2 110 request the contents of fracture log 226 and updates fracture log 308 locally within memory 2 112, SP1 106 may, as a part of the request operation for fracture log 226, clear all indicators in fracture log 226 contained in memory 1 108 upon a successful transmission of the contents of fracture log 226 to SP2 110. Accordingly, all indicators in fracture log 226 have been cleared and indicators within fracture log 308 corresponding to storage extents within source LUN 122 that contain changed data have been set.

Because image phase 306 is set to "replay fracture log," the contents of changed data storage extents associated with source LUN 122 may be copied to corresponding storage extents associated with clone 1 124. As can be seen from FIG. 3C, the state field within clone tracking structure 304 has been changed to "synchronizing." As part of the request operation for fracture log information associated with the synchronizing event, SP2 110 may also instruct SP1 106 that a synchronization operation is progressing. Accordingly, SP1 106 may change the state field of clone tracking structure 232 to indicate that clone 1 is synchronizing. In this way, both SPs maintain current information regarding the state of clones within a clone group. Should there be a scheduled SP reboot or some other situation requiring a trespass of clone group 128 back to SP1 106, SP1 106 may recognize that the state of clone 1 is synchronizing and may retrieve fracture log 308 from memory 2 112 by issuing a request on CMI bus 114 to SP2 110. In this way, even under circumstances where a sync operation does not complete, either SP may complete the sync operation.

Figure 3D:
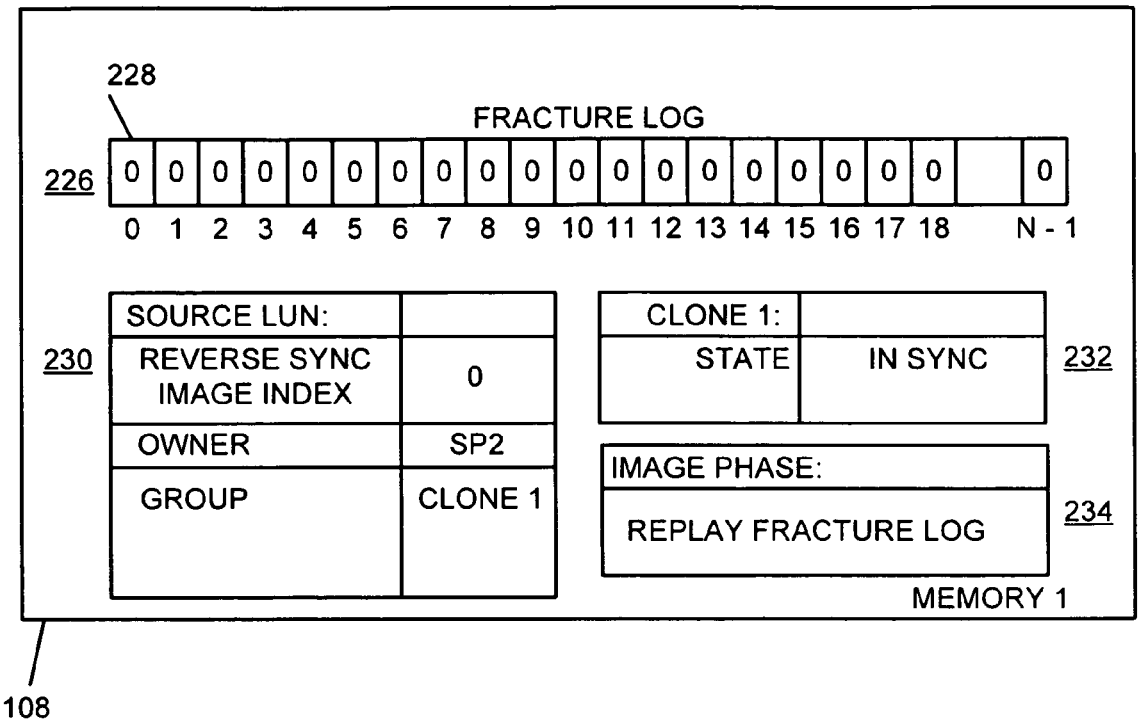
FIG. 3D is a block diagram of an exemplary disk array application environment including trespass and synchronization data structures for managing trespass operations at a point in time after a forward synchronization operation has completed according to an embodiment of the subject matter described herein.
Figure 3D:
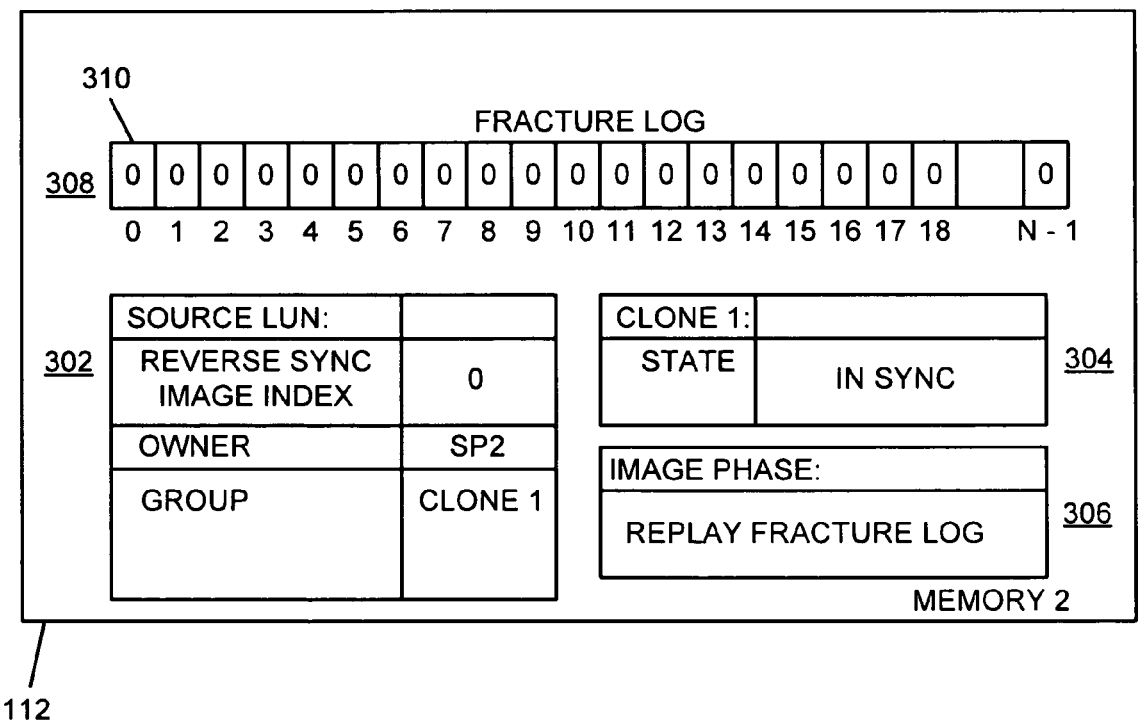

FIG. 3D illustrates disk array application environment 100 after a forward sync operation has been completed. As can be seen from FIG. 3D, indicators 310 at indices one (1) and three (3) of fracture log 308 have been cleared. As well, the state field within clone tracking structure 304 has been changed to "in snyc." As described above, tracking structures are maintained in a consistent fashion in memories associated with both SPs. Accordingly, SP2 110 has copied the state information associated with clone 1 124 and clone tracking structure 304 over CMI bus 114 to SP1 106. In response, SP1 106 has modified the state field within clone tracking structure 232 to indicate that the state of clone 1 124 is "in sync."

Figure 4A:
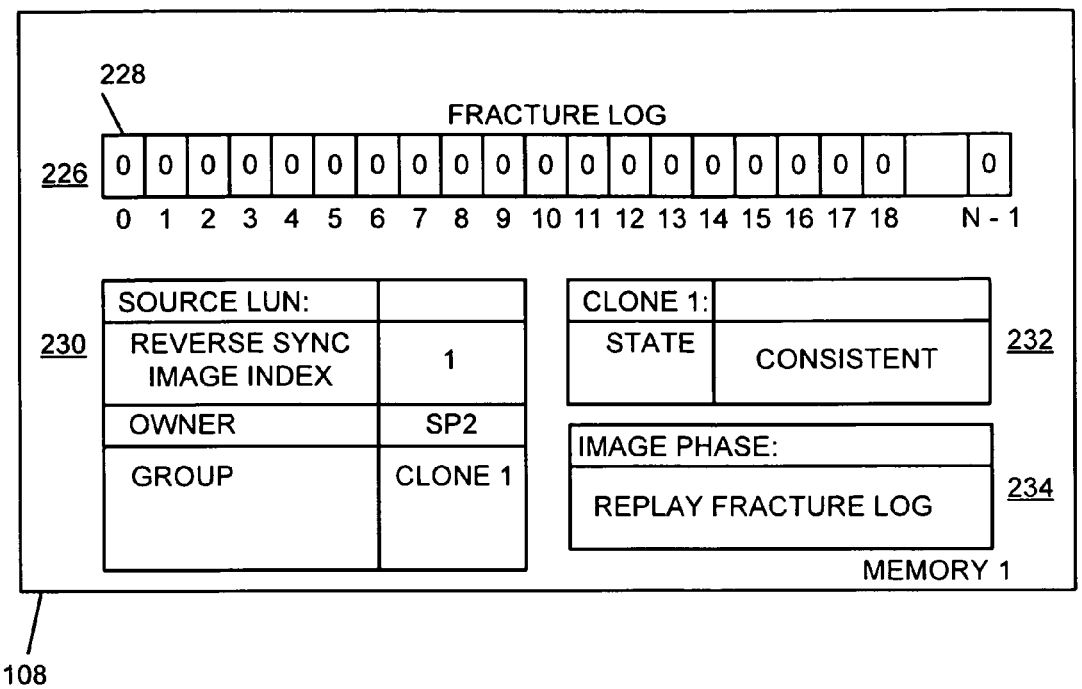
FIG. 4A is a block diagram of an exemplary disk array application environment including trespass and synchronization data structures for managing trespass operations at a point in time prior to a reverse synchronization operation according to an embodiment of the subject matter described herein.
Figure 4A:
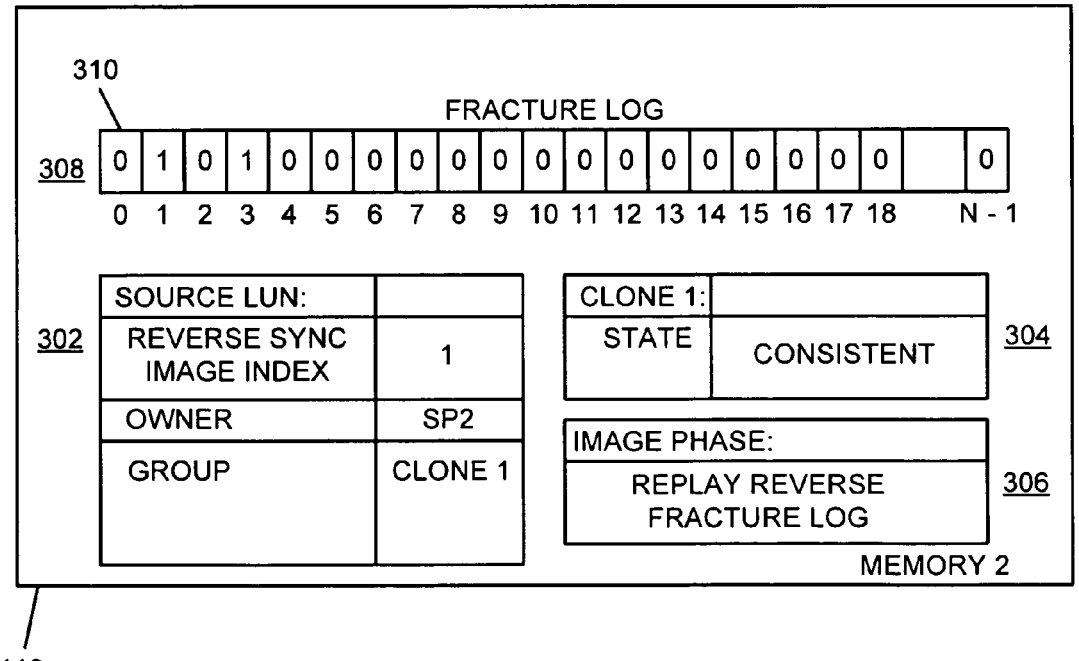
Figure 4B:
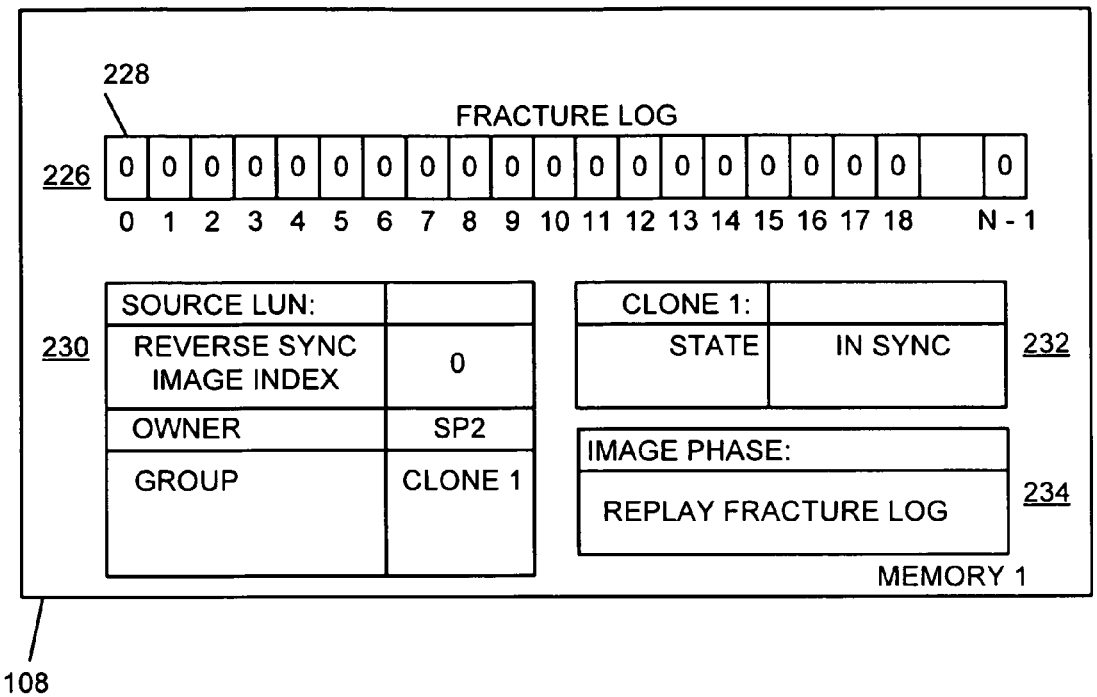
FIG. 4B is a block diagram of an exemplary disk array application environment including trespass and synchronization data structures for managing trespass operations at a point in time after the reverse synchronization operation has been completed according to an embodiment of the subject matter described herein.
Figure 4B:
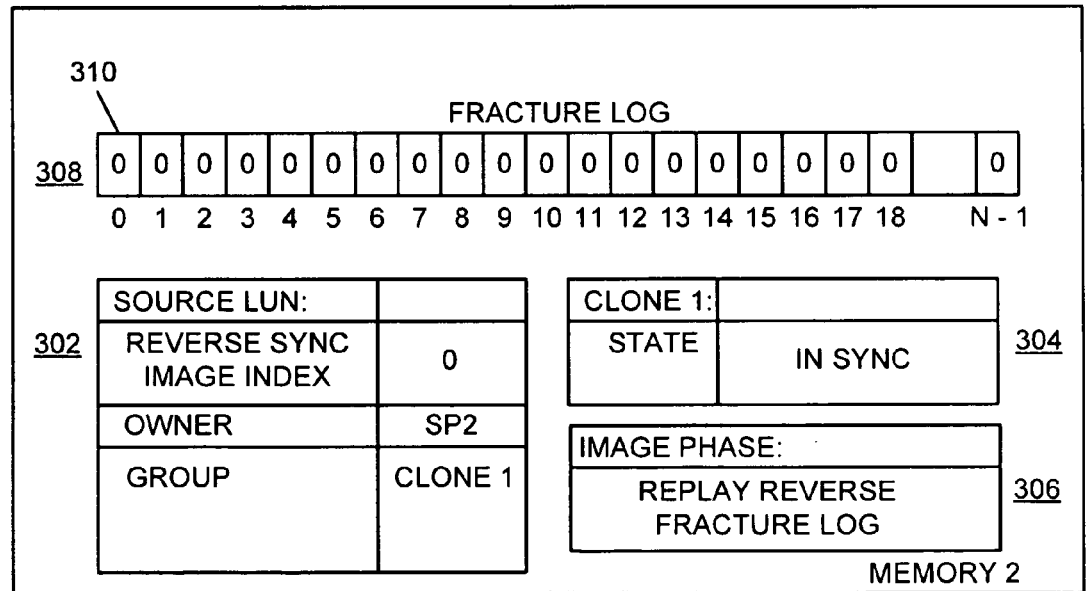

FIGS. 4A-4B depict a reverse sync scenario for disk array application environment 100. In contrast to forward sync operations depicted in FIGS. 3A-3D, FIGS. 4A-4B depict a reverse sync operation wherein a source LUN is updated from a clone. The initial state of FIG. 4A will be assumed to be after a trespass operation has occurred and after a request for a reverse sync operation has been received from application 102, but prior to an initiation of the reverse synchronization. Indicators 310 at indices one (1) and three (3) in fracture log 308 are set to indicate that data at those regions within either source LUN 122 or clone 1 124 contain new data since the last operation that synchronized the data within the two LUNs. For purposes of illustration, it will be assumed within FIGS. 4A-4B that application 102 wishes to discard updates to data represented by source LUN 122 at the regions referenced within fracture log 308 and that application 102 wishes to revert to the data represented within clone 1 124.

It should be understood that application 102 may also mount clone 1 124 for I/O operations, may make modifications to data represented by clone 1 124, and may reverse sync clone 1 124 to source LUN 122. In such a circumstance, fracture log 308 may represent changed data represented by clone 1 124. In this way, fracture log 308 may be used to represent changes in source LUN 122 and clone 1 124. For example, application 102 may mount an older version of data by mounting clone 1 124, may modify that data, and may verify the changed data before overwriting the data represented by source LUN 122 using a reverse sync operation.

As described above, it will be assumed that the changes to source LUN 122 are to be overwritten by the archived data represented by clone 1 124. Accordingly, in response to the request from application 102 to reverse sync source LUN 122 to clone 1 124, SP2 110 may set image phase 306. As can be seen from FIG. 4A, image phase 306 has been set to "replay reverse fracture log."

Because application 102 has requested a reverse sync operation, SP2 110 has set the reverse sync image index field within source LUN tracking structure 302 to one (1) to indicate that a reverse sync operation is to occur and that clone 1 124 is the clone with which to synchronize source LUN 122. As described above in relation to FIG. 3B, the state of clone 1 124 may be consistent after a trespass operation and prior to a sync operation activating. It should also be noted that the reverse sync image index field within source LUN tracking structure 302 may be set to any type of indicator capable of referencing a clone. For example, using integer clone indices, a clone with an index of two (2) may result in a reverse sync image index of two (2) when the clone with an index of two (2) is used to reverse sync the source LUN. For purposes of illustration, the index of clone 1 124 is assumed to be one (1).

As with other operations described above in relation to clone group tracking structures, FIG. 4A illustrates that SP2 110 has communicated clone tracking structure information to SP1 106. In response, SP1 106 has updated source LUN tracking structure 230 to indicate in the reverse sync image index field that one (1) is the index of the clone, clone 1 124, to reverse synchronize with source LUN 122. Because the synchronization has not begun, the state field within clone tracking structure 232 remains set to indicate that the state of clone 1 124 is "consistent." In this way, should SP2 110 not complete the reverse sync operation, SP1 106 may recognize that clone group 128 was in the process of a reverse sync operation and may request fracture log 308 from SP2 110 stored in memory 2 112 and may calculate an image phase of "replay reverse fracture log". When the synchronization process is queued and begins, different states, for example "queued," and "reverse synchronizing," may be represented within the state field of clone tracking structure 304 and may be communicated to SP1 106 for placement within the state field of clone tracking structure 232, as will be described in more detail below. Accordingly, should SP2 110 not complete the reverse sync operation, SP1 106 may recognize that clone group 128 was in the process of a reverse sync operation and may request fracture log 308 from SP2 110 stored in memory 2 112, may calculate an image phase of "replay reverse fracture log", and may complete the reverse synchronization process from the last state completed by SP2 110.

As described above, sync operations may be queued. When queued for a sync operation, the state of clone 1 124 represented within clone tracking structure 304 may be set to "queued." (Not depicted in FIG. 4A). As well, when a reverse synchronization has been initiated, the state of clone 1 124 represented within clone tracking structure 304 may be set to "reverse synchronizing." (Also not depicted in FIG. 4A). As described above, both of these states may be transmitted to SP1 106 in order to allow that unit to take over the sync operation and to complete it in the event that SP2 110 is unable to complete the sync operation.

FIG. 4B illustrates disk array application environment 100 after the reverse sync operation has been completed. As described above, intermediate states of the reverse sync operation have not been depicted. Those intermediate states included a "queued" state and a "reverse synchronizing" state. Accordingly, as can be seen from FIG. 4B, with the reverse synchronization complete, indicators 310 at indices one (1) and three (3) in fracture log 308 have been cleared. Also, the reverse sync image index field within source LUN tracking structure 302 has been cleared and the state of clone 1 124 within clone tracking structure 304 has been set to "in sync." As well, source LUN tracking structure 230 and clone tracking structure 232 have been updated to reflect the operations performed by SP2 110 on clone group 128.

Figure 5:
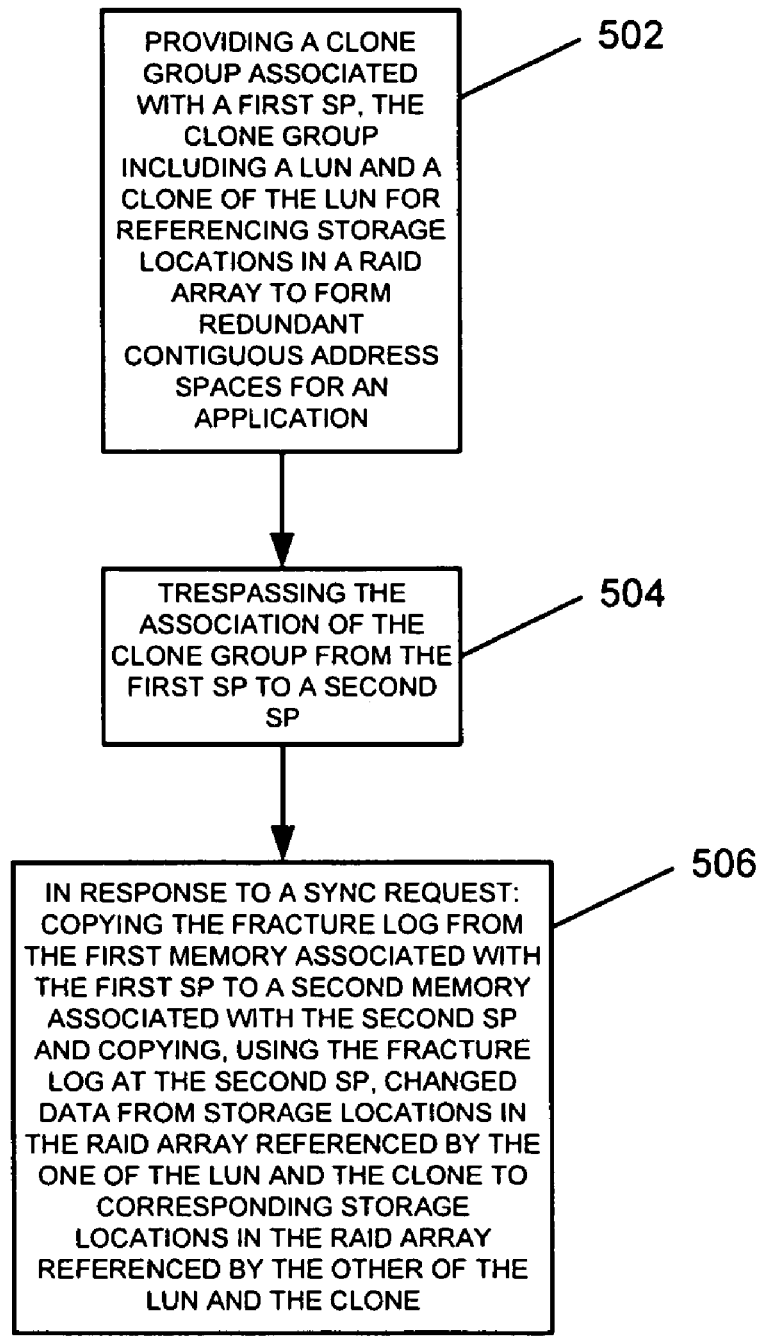
FIG. 5 is a flow chart illustrating a process by which a trespass of a clone group may occur in a disk array application environment with bitmap transfers postponed and without communication of configuration data according to an embodiment of the subject matter described herein.

FIG. 5 illustrates an exemplary process by which a trespass of a clone group may occur in a RAID application environment with bitmap transfers postponed and without communication of configuration data. At block 502, the process may provide a clone group associated with a first SP, the clone group including a LUN and a clone of the LUN for referencing storage locations in a RAID array to form redundant contiguous address spaces for an application. For example, clone group 128 may be provided with source LUN 122 and clone 1 124. Clone group 128 may be associated with SP1 106 by setting the owner field within source LUN tracking structure 230 to indicate that SP1 106 is the owner of clone group 128.

At block 504, the association of the clone group may be trespassed from the first SP to a second SP. For example, clone group 128 may be trespassed from SP1 106 to SP2 110 and the owner field within source LUN tracking structure 302 may be set to indicate that SP2 110 is now the owner of clone group 128.

In response to a sync request, at block 506 the process may copy a fracture log including indicators for tracking changes to data stored in the RAID array in the storage locations referenced by one of the LUN and the clone within the clone group from a first memory associated with the first SP to a second memory associated with the second SP and may copy, using the fracture log at the second SP, changed data from storage locations in the RAID array referenced by the one of the LUN in the clone to corresponding storage locations in the RAID array referenced by the other of the LUN and the clone. For example, fracture log 226 may be maintained in memory 1 108 by SP1 106 to indicate, using indicators 228, locations referenced by one of the source LUN 122 and clone 1 124 that have changed. In response to a sync request from application 102, SP2 110 may copy fracture log 226 from SP1 106 over CMI bus 114 and store it in memory 2 112 as fracture log 308. Further, SP2 110 may copy, using indicators 310 within fracture log 308 data stored in storage extents 120 in storage extent pool 116 associated with changed data locations represented by source LUN 122 to storage extents 120 in data storage extent pool 116 associated with the corresponding locations referenced by clone 1 124.

Figure 6:
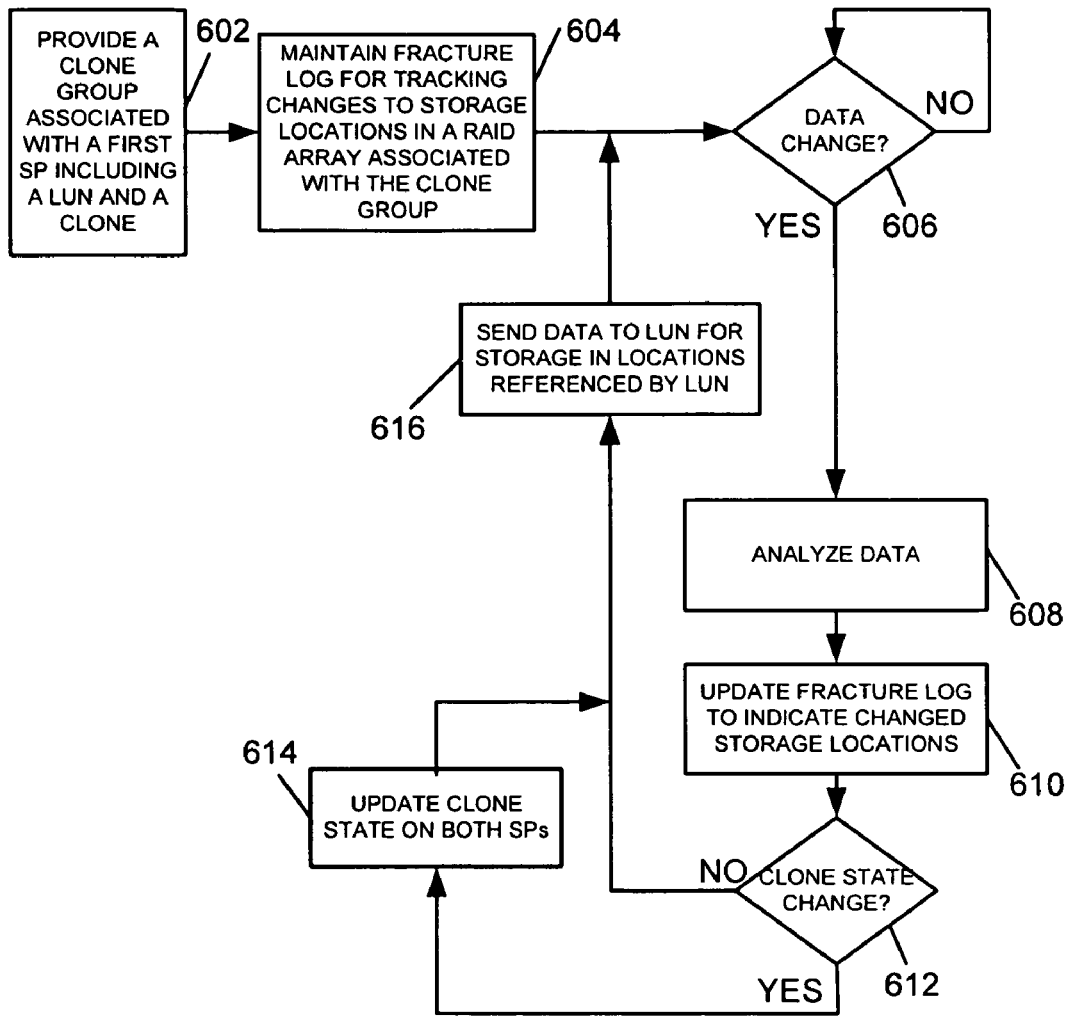
FIG. 6 is a flow chart illustrating a process by which input and output operations may be managed and by which change tracking information may be updated according to an embodiment of the subject matter described herein.

FIG. 6 illustrates an exemplary process by which input and output operations may be managed and by which change tracking information may be updated. At block 602, the process may provide a clone group associated with a first SP including a LUN and a clone. At block 604, the process may maintain a fracture log for tracking changes to storage locations in a RAID array associated with the clone group.

At decision point 606, the process may determine whether any data is to be changed and may continue to check for data changes at decision point 606 until a data change occurs. When a data change has occurred, as determined at decision point 606, the process may analyze the data change at block 608 and may update the fracture log to indicate the changed storage locations at block 610. At decision point 612, the process may determine whether to the data change results in a change to the state of the clone. When a clone state changes results from the data change, the clone state may be updated on both SPs at block 614. When the clone state has been updated on both SPs or when the data change does not result in a clone state change, the process may send the data to the LUN for storage in locations referenced by the LUN. The process may then return to decision point 606 to await another data change.

Figure 7:
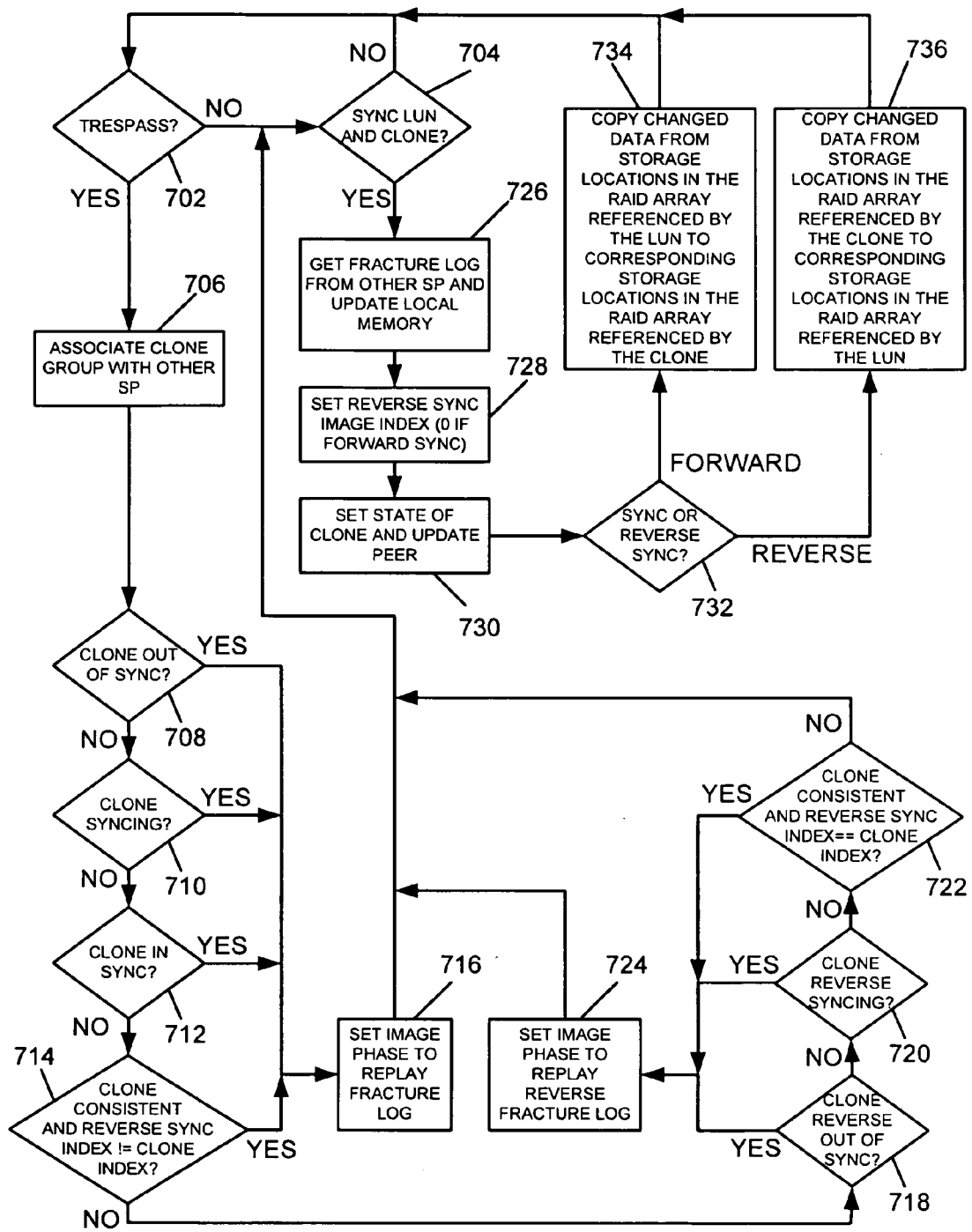
FIG. 7 is a flow chart illustrating a process by which clone groups may be trespassed from one SP to another with bitmap transfers postponed, without communicating configuration data, and with an image phase indicator calculated in order to manage a forward synchronization or a reverse synchronization operation according to an embodiment of the subject matter described herein.

FIG. 7 illustrates an exemplary process by which clone groups may be trespassed from one SP to another with bitmap transfers postponed, without communicating configuration data, and with an image phase indicator calculated in order to manage a forward synchronization or a reverse synchronization operation. At decision point 702, the process may determine whether a trespass operation has been initiated. When no trespass operation has been initiated, the process may determine whether a sync event has been initiated at decision point 704. When no sync operation has been initiated, the process may return to decision point 702 to iteratively check for trespass and sync operations.

When a trespass operation has been initiated, as determined by decision point 702, the process may associate the clone group with the other SP at block 706. At decision point 708, a determination may be made as to whether the state of the clone is "out of sync." When the state of the clone is not out of sync, a determination may be made at decision point 710 as to whether the state of the clone is "syncing." When the state of the clone is not syncing, a determination may be made at decision point 712 as to whether the clone is "in sync." When the state of the clone is not in sync, a determination may be made at decision point 714 as to whether the state of the clone is "consistent" and whether the reverse sync index is not equal to the clone index.

When the clone is consistent and the reverse sync index is not equal to the clone index, as determined at decision point 714, or when the clone is in sync as determined at decision point 712, or when the clone is syncing as determined at decision point 710, or when the clone is out of sync as determined at decision point 708, the process may set the image phase to "replay fracture log" at block 716 and the process may return to decision point 704 to determine whether a sync operation has been initiated. In this way, a sync operation may follow a trespass operation or may be a separately scheduled event.

When a determination has been made at decision point 714 that either the clone is not consistent or the reverse sync index is equal to the clone index, the process may determine whether the state of the clone is "reverse out of sync" at decision point 718. When the state of the clone is not reverse out of sync, a determination may be made at decision point 720 as to whether the state of the clone is "reverse syncing." When the state of the clone is not reverse syncing, a determination may be made at decision point 722 as to whether the state of the clone is "consistent" and whether the reverse sync index is equal to the clone index.

When the state of the clone is either reverse out of sync as determined at decision point 718, or reverse syncing as determined at decision point 720, or consistent and the reverse sync index equals the clone index as determined at decision point 722, the process may set the image phase to "replay reverse fracture log" at block 724 and the process may return to decision point 704 to determine whether a sync operation has been initiated. In this way, a sync operation may follow a trespass operation or may be a separately scheduled event.

When a determination has been made at decision point 722 that either the clone is not consistent or the reverse sync index is not equal to the clone index, the process may also return to decision point 704 to determine whether a sync operation has been initiated as described above.

When a sync operation has been requested, as determined at decision point 704, the process may get the fracture log associated with the clone group from the other SP and update local memory at block 726. The process may set the reverse sync image index at block 728. As described above, the reverse sync image index may be set zero (0) if a forward sync is in process and to the index of the clone to be reverse synced with if a reverse sync is in process.

At block 730, the state of the clone may be set and the peer may be updated with the current state information for the clone. As described above, by updating state information for the clone on the peer, the peer may maintain current information about the clone, and the peer may take over the sync operation in an event that the initiating SP may not finish the sync operation.

At decision point 732, a determination may be made as to whether the sync operation is a forward sync or a reverse sync operation. When the sync is a forward sync operation, the process may copy any changed data from storage locations in the RAID array referenced by the LUN to corresponding storage locations in the RAID array referenced by the clone at block 724 and may return to decision point 702 to determine whether a trespass operation has been initiated.

When the sync is a reverse sync operation, the process may copy changed data from storage locations in the RAID array referenced by the clone to corresponding storage locations in the RAID array referenced by the LUN at block 736 and may return to decision point 702 to determine whether a trespass operation has been initiated.

As described above, the peer SP may be updated with clone tracking structure information for any changes to any clone tracking structure. For ease of illustration, certain of these updates have not been depicted within FIG. 7. Reference may be made to the descriptions above in relation to FIGS. 3A-3D and 4A-4B for details of these operations.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for postponing bitmap transfers and eliminating configuration information transfers during trespass operations in a disk array environment, the method comprising:
    (a) storing, on a disk array, a clone group including a logical unit (LUN) representing a storage partition on the disk array and a clone of the LUN, the clone being a copy of the data referenced by the LUN at a point in time;
    (b) associating the clone group with a first storage processor (SP) for writing data to the disk array;
    (c) tracking changes between the LUN and the clone by maintaining a first data structure indicative of the changes in a memory associated with the first SP;
    (d) changing the association of the clone group to a second SP for writing data to the disk array without transferring the first data structure to memory associated with the second SP; and
    (e) after the changing of the association of the clone group to the second SP:
        calculating, at the second SP and using clone state information stored in the memory associated with the second SP that was transferred from the first SP independently of the change in the association, an indicator that indicates whether a forward synchronization or a reverse synchronization is required between the clone and the LUN, and, in response to determining to perform a forward or a reverse synchronization, transferring the first data structure to the memory associated with the second SP and performing the forward or reverse synchronization at the second SP using the first data structure.

2. The method of claim 1 wherein changing the association of the clone group to the second SP includes modifying a clone group owner field within a second data structure accessible by at least one of the first SP and second SP to indicate that the second SP owns the clone group.

3. The method of claim 1 comprising detecting a synchronization (sync) event involving the LUN and the clone and, in response, transferring the first data structure to the memory associated with the second SP.

4. The method of claim 3 wherein the sync event includes a forward synchronization event indicating to synchronize from the LUN to the clone.

5. The method of claim 3 wherein the sync event includes a reverse synchronization event indicating to synchronize from the clone to the LUN.

6. The method of claim 5 comprising setting a reverse synchronization image index to indicate that the sync event includes a reverse synchronization event and to indicate an index associated with the clone.

7. The method of claim 1 wherein the indicator comprises an image phase of the clone.

8. The method of claim 7 wherein calculating the image phase of the clone includes setting the image phase to a forward synchronization value in response to the clone being in an out-of-sync state.

9. The method of claim 8 wherein the forward synchronization value includes an indication to synchronize from the LUN to the clone.

10. The method of claim 7 wherein calculating the image phase of the clone includes setting the image phase to a reverse synchronization value in response to the clone being in a reverse-out-of-sync state.

11. The method of claim 10 wherein the reverse synchronization value includes an indication to synchronize from the clone to the LUN.

12. The method of claim 7 wherein calculating the image phase of the clone includes setting the image phase to a forward synchronization value in response to the clone being in a synchronizing state.

13. The method of claim 7 wherein calculating the image phase of the clone includes setting the image phase to a forward synchronization value in response to the clone being in an in-sync state.

14. The method of claim 7 wherein calculating the image phase of the clone includes setting the image phase to a reverse synchronization value in response to the clone being in a reverse-synchronizing state.

15. The method of claim 7 comprising detecting a sync event involving the LUN and the clone and, in response, transferring the first data structure to the memory associated with the second SP and copying changed data, using the first data structure at the second SP and the image phase, wherein the image phase comprises a forward synchronization value, to determine that changed data should be copied from the LUN to the clone.

16. The method of claim 7 comprising detecting a sync event involving the LUN and the clone and, in response, transferring the first data structure to the memory associated with the second SP and copying changed data, using the first data structure at the second SP and the image phase, wherein the image phase comprises a reverse synchronization value, to determine that changed data should be copied from the clone to the LUN.

17. The method of claim 1 comprising communicating a clone group tracking structure to the first SP from the second SP.

18. The method of claim 17 wherein the clone group tracking structure includes a source LUN tracking structure having a reverse synchronization image index field.

19. The method of claim 17 wherein the clone group tracking structure includes a clone tracking structure having a clone state field.

20. The method of claim 17 wherein communicating the clone group tracking structure to the first SP from the second SP is performed over a communications management interface (CMI) bus.

21. The method of claim 1 wherein changing the association of the clone group to a second SP includes changing the association in response to an event selected from a group consisting of a host load balancing event, a host failover event, an SP failure event, and a manual change event.

22. A method for postponing bitmap transfers and eliminating configuration information transfers during trespass operations in a disk array environment, the method comprising:
(a) storing, on a disk array, a clone group including a logical unit (LUN) representing a storage partition on the disk array and a clone of the LUN, the clone being a copy of the data referenced by the LUN at a point in time;
(b) associating the clone group with a first storage processor (SP) for writing data to the disk array;
(c) tracking chances between the LUN and the clone by maintaining a first data structure indicative of the chances in a memory associated with the first SP;
(d) changing the association of the clone group to a second SP for writing data to the disk array without transferring the first data structure to memory associated with the second SP, and calculating, at the second SP, an image phase of the clone, wherein calculating the image phase of the clone includes setting the image phase to a forward synchronization value in response to the clone being in a consistent state and a reverse synchronization image index for the LUN within a second data structure accessible by at least one of the first SP and second SP not being equal to an index of the clone.

23. A method for postponing bitmap transfers and eliminating configuration information transfers during trespass operations in a disk array environment, the method comprising:
(a) storing, on a disk array, a clone group including a logical unit (LUN) representing a storage partition on the disk array and a clone of the LUN, the clone being a copy of the data referenced by the LUN at a point in time;
(b) associating the clone group with a first storage processor (SP) for writing data to the disk array;
(c) tracking chances between the LUN and the clone by maintaining a first data structure indicative of the chances in a memory associated with the first SP;
(d) changing the association of the clone group to a second SP for writing data to the disk array without transferring the first data structure to memory associated with the second SP, and calculating, at the second SP, an image phase of the clone, wherein calculating the image phase of the clone includes setting the image phase to a reverse synchronization value in response to the clone being in a consistent state and a reverse synchronization image index for the LUN within a second data structure accessible by at least one of the first SP and second SP being equal to an index of the clone.

24. A method for postponing bitmap transfers and eliminating configuration information transfers during trespass operations in a disk array environment, the method comprising:
in response to a storage processor (SP) failover event,
(a) trespassing a plurality of clone groups from a first SP to a second SP without transferring change tracking and configuration information associated with the plurality of clone groups between the first SP and the second SP; and
(b) distributing transfer of change tracking information associated with individual clone groups within the plurality of clone groups over time in response to synchronization events for individual clone groups, wherein distributing the transfer of the chance tracking information over time comprises, for each of the clone groups, after trespassing the clone group from the first SP to the second SP:
calculating, at the second SP and using clone state information stored in the memory associated with the second SP that was transferred from the first SP independently of the trespassing, an indicator that indicates whether a forward synchronization or a reverse synchronization is required between clones and a LUN in each clone group, and, in response to determining to perform a forward or a reverse synchronization, transferring the chance tracking information for the clone group to memory associated with the second SP and performing the forward or reverse synchronization at the second SP using the first data structure.

25. A system for postponing bitmap transfers and eliminating configuration information transfers during trespass operations in a disk array environment, the system comprising:
(a) a disk array including a plurality of disks;
(b) a first data storage extent pool representing at least a portion of the disk array and including at least one data storage extent;
(c) a clone group, including a logical unit (LUN) and a clone of the LUN, for referencing storage locations in the disk array to form a redundant contiguous address space for an application;
(d) a first storage processor (SP) for writing data to the disk array and a first memory associated with the first SP, the first SP being adapted to:
(i) associate the clone group with the first SP; and
(ii) track changes between the LUN and the clone by maintaining a first data structure indicative of the changes in the first memory; and
(e) a second SP for writing data to the disk array and a second memory associated with the second SP, the second SP being adapted to change the association of the clone group to the second SP without transferring the first data structure to the second memory, wherein after the changing of the association of the clone croup to the second SP:
the second SP calculates, using clone state information stored in the second memory that was transferred from the first SP independently of the chance in the association, an indicator that indicates whether a forward synchronization or a reverse synchronization is required between the clone and the LUN, and, in response to determining to perform a forward or a reverse synchronization, the first SP transfers the first data structure from the first memory to the second memory and the second SP performs the forward or reverse synchronization at the second SP using the first data structure.

26. The system of claim 25 wherein the second SP is adapted to change the association of the clone group to the second SP by modifying a clone group owner field within a second data structure accessible by at least one of the first SP and second SP to indicate that the second SP owns the clone group.

27. The system of claim 25 wherein the second SP is adapted to detect a synchronization (sync) event involving the LUN and the clone and, in response, to transfer the first data structure to the second memory associated with the second SP.

28. The method of claim 27 wherein the sync event is a forward synchronization indicating to synchronize the clone with the LUN.

29. The system of claim 27 wherein the sync event is a reverse synchronization indicating to synchronize the LUN with the clone.

30. The system of claim 29 wherein the second SP is adapted to set a reverse synchronization image index to indicate that the sync event includes a reverse synchronization event and to indicate an index associated with the clone.

31. The system of claim 25 wherein the indicator comprises an image phase of the clone.

32. The system of claim 31 wherein the second SP is adapted to set the image phase of the clone to a forward synchronization value in response to the clone being in an out-of-sync state.

33. The system of claim 31 wherein the second SP is adapted set the image phase of the clone to a forward synchronization value in response to the clone being in a synchronizing state.

34. The system of claim 31 wherein the second SP is adapted to set the image phase of the clone to a forward synchronization value in response to the clone being in an in-sync state.

35. The system of claim 31 wherein the second SP is adapted to set the image phase of the clone to a reverse synchronization value in response to the clone being in a reverse-out-of-sync state.

36. The system of claim 31 wherein the second SP is adapted to set the image phase of the clone to a reverse synchronization value in response to the clone being in a reverse-synchronizing state.

37. The system of claim 31 wherein the second SP is adapted to detect a sync event involving the LUN and clone and, in response, to transfer the first data structure to the second memory and copy changed data, using the first data structure at the second SP and the image phase, wherein the image phase comprises a forward synchronization value, to determine that changed data should be copied from the LUN to the clone.

38. The system of claim 31 wherein the second SP is adapted to detect a sync event involving the LUN and the clone and, in response, to transfer the first data structure to the second memory and copy changed data, using the first data structure at the second SP and the image phase, wherein the image phase comprises a reverse synchronization value, to determine that changed data should be copied from the clone to the LUN.

39. The system of claim 31 wherein the second SP is adapted to copy changed data by using the image phase to determine whether to copy data from the LUN to the clone.

40. The system of claim 31 wherein the second SP is adapted to copy changed data by using the image phase to determine whether to copy data from the clone to the LUN.

41. The system of claim 25 wherein the second SP is adapted to communicate a clone group tracking structure from the second SP to the first SP.

42. The system of claim 41 wherein the clone group tracking structure includes a source LUN tracking structure having a reverse synchronization image index field.

43. The system of claim 41 wherein the clone group tracking structure includes a clone tracking structure having a clone state field.

44. The system of claim 41 wherein the second SP is adapted to communicate the clone group tracking structure to the first SP over a communications management interface (CMI) bus.

45. The system of claim 25 wherein the second SP is adapted to change the association of the clone group to the second SP in response to an event selected from a group consisting of a host load balancing event, a host failover event, an SP failure event, and a manual change event.

46. A system for postponing bitmap transfers and eliminating configuration information transfers during trespass operations in a disk array environment, the system comprising:
(a) a disk array including a plurality of disks;
(b) a first data storage extent pool representing at least a portion of the disk array and including at least one data storage extent;
(c) a clone group, including a logical unit (LUN) and a clone of the LUN, for referencing storage locations in the disk array to form a redundant contiguous address space for an application;
(d) a first storage processor (SP) for writing data to the disk array and a first memory associated with the first SP, the first SP being adapted to:
(i) associate the clone group with the first SP; and
(ii) track chances between the LUN and the clone by maintaining a first data structure indicative of the chances in the first memory; and
(e) a second SP for writing data to the disk array and a second memory associated with the second SP, the second SP being adapted to change the association of the clone group to the second SP without transferring the first data structure to the second memory wherein the second SP is adapted to calculate an image phase for the clone and wherein the second SP is adapted to set the image phase of the clone to a forward synchronization value in response to the clone being in a consistent state and a reverse synchronization image index for the LUN within a second data structure accessible by at least one of the first SP and second SP not being equal to an index of the clone.

47. A system for postponing bitmap transfers and eliminating configuration information transfers during trespass operations in a disk array environment, the system comprising:
(a) a disk array including a plurality of disks;
(b) a first data storage extent pool representing at least a portion of the disk array and including at least one data storage extent;
(c) a clone group, including a logical unit (LUN) and a clone of the LUN, for referencing storage locations in the disk array to form a redundant contiguous address space for an application;
(d) a first storage processor (SP) for writing data to the disk array and a first memory associated with the first SP, the first SP being adapted to:
(i) associate the clone group with the first SP; and
(ii) track changes between the LUN and the clone by maintaining a first data structure indicative of the chances in the first memory; and
(e) a second SP for writing data to the disk array and a second memory associated with the second SP, the second SP being adapted to chance the association of the clone group to the second SP without transferring the first data structure to the second memory wherein the second SP is adapted to calculate an image phase for the clone and wherein the second SP is adapted to set the image phase of the clone to a reverse synchronization value in response to the clone being in a consistent state and a reverse synchronization image index for the LUN within a second data structure accessible by at least one of the first SP and second SP being equal to an index of the clone.

48. A computer program product comprising computer-executable instructions embodied in a computer-readable medium for performing steps comprising:
(a) storing, on a disk array, a clone group including a logical unit (LUN) representing a storage partition on the disk array and a clone of the LUN, the clone being a copy of the data referenced by the LUN at a point in time;

(b) associating the clone group with a first storage processor (SP) for writing data to the disk array;

(c) tracking changes between the LUN and the clone by maintaining a first data structure indicative of the changes in a memory associated with the first SP;

(d) changing the association of the clone group to a second SP for writing data to the disk array without transferring the first data structure to memory associated with the second SP; and (e) after the changing of the association of the clone group to the second SP:

calculating, at the second SP and using clone state information stored in the memory associated with the second SP that was transferred from the first SP independently of the chance in the association, an indicator that indicates whether a forward synchronization or a reverse synchronization is required between the clone and the LUN, and, in response to determining to perform a forward or a reverse synchronization, transferring the first data structure to the memory associated with the second SP and performing the forward or reverse synchronization at the second SP using the first data structure.

* * * * *